Aug. 4, 1942.  H. SPITZER  2,291,990
ELECTRIC CIRCUIT CONTROLLER
Filed Dec. 17, 1940
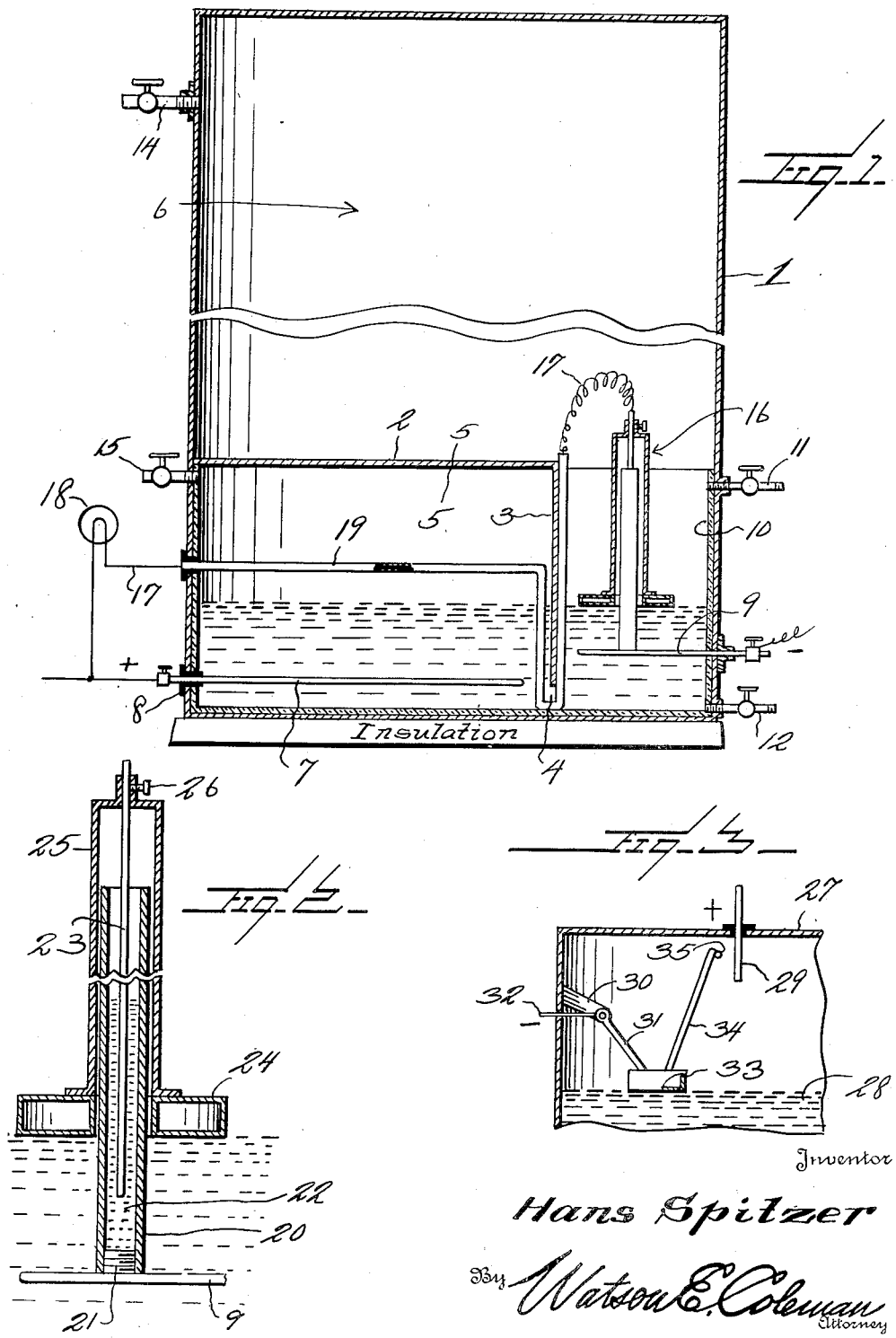
Inventor
Hans Spitzer
By Watson E. Coleman
Attorney Patented Aug. 4, 1942

2,291,990

UNITED STATES PATENT OFFICE 2,291,990

ELECTRIC CIRCUIT CONTROLLER

Hans Spitzer, St. Maarten, Curacao, Dutch West Indies

Application December 17, 1940, Serial No. 370,565

3 Claims. (Cl. 200—84)

This invention relates generally to improvements in electric circuit controlling means and while the same is capable of various applications or uses, it is designed primarily for use in an electrolytic hydrogen and oxygen accumulator.

The primary object of the present invention is to provide a fluid-borne circuit controlling element forming a part of a circuit closer, which is designed to be used for opening and closing an electric circuit in accordance with the rise and fall of the level of a fluid body whereby to control an electrical instrument of a desired character such, for example, as a signaling device.

Another object of the invention is to provide a fluid actuated electric circuit controller which is designed to operate in an electrolyte fluid for shunting the current flow through such fluid to and through a signaling element when the level of the fluid drops to a predetermined extent.

Still another object of the invention is to provide a novel electric circuit controlling device consisting of a fixed guide of non-current conducting material having at one end a contact and a floating contact slidably connected with said guide and operating therein to be moved into and out of engagement with the first contact in response to the rise and fall of the fluid by which the second contact element is supported.

The invention will be best understood from a consideration of the following detailed description taken in connection with the accompanying drawing forming part of this specification, with the understanding, however, that the invention is not to be confined to any strict conformity with the showing of the drawing but may be changed or modified so long as such changes or modifications mark no material departure from the salient features of the invention as expressed in the appended claims.

In the drawing:

Fig. 1 is a view in vertical section of a hydrogen-oxygen accumulator showing therein partially in section the circuit controlling device embodying the present invention.

Fig. 2 is a view in vertical section upon an enlarged scale of the circuit controlling device.

Fig. 3 is a view of a modified form of the circuit controller.

Referring now more particularly to the drawing, the numeral 1 generally designates a receptacle having a partitioning wall extending partially transversely thereof, as indicated at 2, and a vertical partitioning wall 3 connected with the wall 2 and extending downwardly therefrom and terminating in spaced relation with the bottom of the receptacle, thus providing a fluid transfer passage 4 between the two chambers 5 and 6 which in the present device accumulate oxygen and hydrogen, respectively.

The numeral 7 designates an electrode extending into the oxygen chamber and insulated from the wall of the receptacle, as indicated at 8. This electrode is disposed in the plane of the lower edge of the wall 3 or just slightly above such plane, as illustrated. Within the lower part of the chamber 6 is an electrode 9 which is disposed in a plane above the plane of the electrode 7 and to which negative electric current is conducted. The inner surface of the wall of the receptacle is covered by a suitable acid resisting material 10 and the partition wall 3 may also be formed of the same material although this is not necessary with respect to the wall 2 which is not immersed in the acidulated water which is broken down by the current passing therethrough between the electrodes.

The numerals 11 and 12 designate respectively upper and lower valved nozzles by means of which the introduction of electrolyte into the receptacle may be accomplished while the numerals 14 and 15 designate exhaust or discharge pipes which are valve controlled, for respectively removing hydrogen and oxygen from their chambers.

The electric circuit controlling device embodying the present invention is indicated generally by the numeral 16. This device causes electric current to be shunted from the electrodes when the electrolyte drops to a predetermined level, to pass from the cathode 9 through the current conductor 17 to the wire which carries positive current to the anode and through a signaling or indicating device such, for example, as the incandescent lamp 18. The conductor 17 is housed through a portion of its length within the receptacle within a rubber or other suitable sheath 19 so as to protect it from contact with the acidulated water in the receptacle.

The circuit controller 16 specifically comprises the vertically arranged tubular body 20 which is secured to the cathode 9 so that a portion of the cathode will be exposed within the lower end of the tube but electrolyte fluid cannot enter the tube. Any suitable means may be employed for accomplishing this type of connection such as, for example, by the formation of a metallic stud 21 upon the top of the cathode 9 which is threadably engaged in and closes the lower end of the tube 20. The tube 20 is formed of a suitable non-current conducting material and is partially filled with oil, as indicated at 22, to prevent sparking when an electric circuit is made within the tube between the portion 21 of the cathode and the movable terminal 23 which is in the form of a rod which extends downwardly into the tube and is supported in a manner about to be described.

Encircling the tube 20 is a float body 24 which carries a relatively tall frame 25 which encloses the upper part of the tube and which has the upper end of the movable terminal rod 23 secured thereto, as indicated at 26. To the upper end of this rod 23, the current conductor 17 is electrically connected. It will be seen that when the float 24 moves up and down along the tube 20 upon changes in the elevation of the electrolyte fluid, the conductor or terminal 23 will be moved in the oil bath 22 and when the level of the electrolyte fluid drops lower than is desirable, the end of the contact rod 23 will make electrical connection with the cathode 9 and thus shunt current through the conductor 17 and through the indicator lamp 18 to give warning that replenishment of the electrolyte is necessary. When the electrolyte is replenished and the float again rises, any spark which may be formed upon separation of the terminal 23 from the cathode will be quenched by the oil.

Fig. 3 illustrates a slightly modified form of the fluid supported and fluid raised and lowered terminal of the switch or circuit closer. In this form of the invention a portion of a fluid receptacle is indicated by the numeral 27, the fluid therein being indicated at 28, and extending into the receptacle through the top wall is an anode 29.

Pivotally attached to a wall of the receptacle adjacent to the anode, as by means of the bracket 30, is a current conducting arm 31 to which is electrically connected the negative current carrying conductor 32. Rigidly attached to the conductor arm 31 is a current conducting float 33 and extending upwardly and forwardly from this float is an anode 34 which may be provided with a cross-head 35 upon its upper end. The operation of this modified form of the invention will be readily apparent. When the level of the fluid 28 rises, the float 33 will be raised, oscillating about the pivotal point for the conductor arm 31 and consequently swinging the free upper end or cross-head portion 35 of the anode away from the depending cathode 29. When the fluid level drops, the float 33 will swing downwardly and away from the cathode 29, thus causing the free end of the anode to move in an arc toward and in contact with the cathode to close the electric circuit in which the conductor is connected.

What is claimed is:

1. An electric circuit controller, comprising an electrode, a tubular body secured at one end to the electrode and having a portion of the electrode exposed therein, the other end of the body being open, the first-mentioned end of the tubular body being closed against the entrance of fluid, a float attached to said body to move freely lengthwise of the body, and an electrode supported from the float and extending downwardly through the open upper end of and into the tubular body for contact with the first electrode when the float is lowered a predetermined distance.

2. A circuit controller, comprising a vertically disposed tubular body closed at one end and having its other end open, an electric circuit terminal within the closed end of the body, a float connected with the body to move lengthwise thereon, and a current conducting electrode suspended by one end from the float and extending downwardly through the open end of and into the tubular body for engagement with said contact upon movement of the float a predetermined distance in one direction lengthwise of the body.

3. A circuit controller, comprising a tubular body adapted to be disposed vertically within a a fluid and having its lower end closed and its upper end open, an electric circuit terminal within the closed lower end of the tubular body, a float body encircling the tubular body and having free movement lengthwise thereof, a frame supported by the float and extending beyond the upper end of the tubular body, and a current conducting rod secured at one end to the frame and extending downwardly therefrom through the open end of and into the tubular body.

HANS SPITZER.